United States Patent
Koyama et al.

[11] Patent Number: 6,147,753
[45] Date of Patent: Nov. 14, 2000

[54] MULTILAYER, CUSHIONED LIQUID DROP DETECTOR

[75] Inventors: Tadashi Koyama; Keiji Tsunetomo; Shuhei Tanaka; Hideki Imanishi, all of Osaka, Japan

[73] Assignee: Nippon Sheet Glass Co., Ltd., Osaki, Japan

[21] Appl. No.: 09/307,756

[22] Filed: May 10, 1999

[30] Foreign Application Priority Data

May 12, 1998 [JP] Japan .................................. 10-128990

[51] Int. Cl.⁷ .................................................. G01N 21/00
[52] U.S. Cl. ........................................ 356/237.3; 356/445
[58] Field of Search ................................ 356/237.3, 445

[56] References Cited

U.S. PATENT DOCUMENTS

| | | | |
|---|---|---|---|
| 3,947,131 | 3/1976 | Karl ........................................ | 356/209 |
| 5,710,633 | 1/1998 | Klappenbach et al. ................. | 356/445 |
| 5,838,454 | 11/1998 | Pientka .................................... | 356/445 |
| 5,898,183 | 4/1999 | Teder ...................................... | 250/574 |
| 5,917,603 | 6/1999 | Tanaka et al. .......................... | 356/388 |

FOREIGN PATENT DOCUMENTS 62-163949 7/1987 Japan .
8-261974 10/1996 Japan .

*Primary Examiner*—Frank G. Font
*Assistant Examiner*—Philip Natividad
*Attorney, Agent, or Firm*—Pillsbury, Madison & Sutro LLP

[57] ABSTRACT

A liquid drop detector which may be fixed or attached by a simple operation, without machining, to a window glass, includes a light emitting element, a light receiving element and light guiding bodies wherein the light emitted by the light emitting element is introduced through a diffraction grating into a first light guiding body and after undergoing total internal reflection within the first light guiding body it is introduced through a silicon member, through an elongated light guiding body, through an additional silicon member, and into a windshield. After traveling within the windshield by total internal reflection, the light passes through a silicon member, reenters the elongated light guiding body, passes through another silicon member and enters a second light guiding body which guides it to a receiver. When rain drops adhere to the outside surface of the windshield at points corresponding to the total internal reflection points at the outer surface of the windshield, the light will leak out of the windshield. As a result of this, the amount of light received by the light receiving element is lessened, thereby providing for detection of the adhesion of rain drops based thereupon so as to output a signal for driving a device such as the windshield wiper.

16 Claims, 3 Drawing Sheets

MULTILAYER, CUSHIONED LIQUID DROP DETECTOR

BACKGROUND OF THE INVENTION

1. Field of the Invention

The present invention relates to a liquid drop detector for use in a device such as a rain sensor.

2. Description of Related Art

Attempts have been made to detect water drops present or adhering upon the front glass (windshield) of a car so as to automatically operate or initiate a wiper. There are already known various methods for achieving such a detection, including an electric detection method, an optical detection method, and so on.

According to the electric detection method, as shown in Japanese Laid-Open Patent No. Hei 8-261974 (1996), there is disposed a transparent electrode of a so-called "comb" shape inside of a glass plate, wherein the dielectric change between the transparent electrodes of the "comb" shape is detected, being caused by adhesion of water drops on the glass plate. The control of closing or opening of a window or of operating a heater is actuated based thereon.

Further, as one example of an optical detection method, in Japanese Laid-Open Patent No. Sho 62-163949 (1987) there is disclosed a construction in which there are provided two light sources, wherein the incident angle of the light from one of these is set to be greater than a critical angle for a total internal reflection to occur upon the detection surface thereof, while the light from the other source is set to be less than the critical angle for the total internal reflection to occur upon the detection surface thereof, thereby enabling discrimination of the presence or absence of water drops upon a glass.

The apparatus of the electric detection method, involves detecting changes such as the electric resistance and the electric capacitance and so on, between the electrodes. However, it is inferior in durability and sensitivity thereof, and in particular, for the windshield of an automobile, it is important that the detected signal corresponds to the sight of a driver or a passenger, therefore, a sensor of the optical method is preferable.

In some situations, even with the optical detection method, it is difficult to detect drops with accuracy since light from an outside source easily enters into a light receiving means in the structure of the conventional detector. In particular when the light emitting means and the light receiving means is attached on the existing windshield later, this problem is very troublesome, as is the operation of adjustments to the optical axis thereof.

SUMMARY OF THE INVENTION

For resolving the problems mentioned above, according to the present invention, there is provided a liquid drop detector, comprising:

a case body attached on the one side surface of said transparent substrate;

light emitting means for emitting a light;

light receiving means for receiving the light;

light guiding means for guiding the light emitted from said light emitting means into said transparent substrate, as well as for guiding the light experiencing total internal reflection within said transparent substrate to said light receiving means, wherein said light emitting means, light receiving means and said light guiding means are received inside said case body.

With this construction, it is possible to add with ease a function of liquid drop detecting to an existing glass window.

According to the present invention, it is preferable that said light guiding means is constructed with a plurality of light guiding bodies piled up (stacked) in a direction of the thickness of said detector and at least one of those plurality of said light guiding bodies has elasticity, or that a non-volatile liquid lies between each or any of the plurality of said light guiding bodies or between said light guiding body and said transparent substrate.

With this construction, no air layer is formed between the plurality of light guiding bodies nor between the light guiding body and the transparent substrate, thereby achieving a certain entrance of the light emitted from the light emitting means into the transparent substrate, as well as a certain arrival of the light undergoing the total internal reflection within the transparent substrate at the light receiving means.

Further, according to the present invention, said light guiding means can be constructed with a light guiding body for guiding the light emitted from said light emitting means into said transparent substrate, and a light guiding body for guiding the light undergoing the total internal reflection within said transparent substrate into said light receiving means, which are formed separately.

With this construction, the light emitted from the light emitting means can be prohibited from entering into the light receiving means directly without passing through the inside of the transparent substrate, thereby improving the sensitivity of detection.

Further, according to the present invention, wherein said light guiding means may include a light guiding body, for guiding the light emitted from said light emitting means into said transparent substrate, the light guiding body being formed in a plate-like shape, and said body may have side surfaces at both sides extending outside gradually along with a direction of propagation of the light.

With this construction, the incident angle of the light emitted from the light emitting means into said body is small with regard to said surface, and thereby the light emitted into said body is totally reflected without escaping from said surface to outside. Therefore it is possible to adjust the opening angle of the detection light emitted from the light emitting means to a desired angle, for instance approximately 10°, thereby ensuring that a large portion of the light emitted from the light emitting means will enter the light receiving means.

Further, according to the present invention, said light guiding means may include a light guiding body, for guiding the light undergoing the total internal reflection within said transparent substrate into said light receiving means, the light guiding body being formed in a plate-like shape, and said body may have side surfaces at both sides narrowing gradually toward said light receiving means along with a direction of propagation of the light.

Since a large portion of the light emitted from the light emitting means is lost due to attenuation or is guided outside of the light receiving means, the light reaching to the light receiving means is a small portion of the original amount thereof. Detection of such a small amount of light calls for an improvement of sensitivity of the light receiving means, although there are limitations to this. Therefore, using such a structure as mentioned above, the light that otherwise might escape detection by the light receiving means can be converged into the light receiving means, thereby obtaining the sensitivity necessary for detection without greatly increasing the sensitivity of the light receiving means.

Further, according to the present invention, said light guiding body for guiding the light emitted from said light emitting means into said transparent substrate and said light guiding body for guiding the light undergoing the total internal reflection within said transparent substrate into said light receiving means may be processed with light shielding for preventing from an intrusion of an exterior light except for places being necessary, or received inside a light shielding member for protecting therefrom.

With this construction, it is possible to prevent external disturbance due to light from an outside source.

Furthermore, according to the present invention, said case includes a base to be fixed onto one side surface of said transparent substrate and a cover to be attached onto said base, and an inside of said case is kept air-tight through the means by which said cover is attached onto said base, and, more preferably, a desiccant is further provided within said case.

With this construction, condensation is prevented from forming inside of the detector.

Furthermore, according to the present invention, there may be further provided a monitor light receiving means for detecting a portion of the light emitted from said light emitting means, wherein the light amount output by said light emitting means is adjusted so that the light received by said monitor light receiving means is kept constant in the amount thereof, thereby enabling a stable detection of liquid drops.

Further, according to the present invention, said light guiding means may further comprise an optical member for guiding the light emitted from said light emitting means into said light guiding means at a predetermined angle, or an optical member for emitting the light toward said light receiving means from said light guiding means at a predetermined angle.

According to the present invention, said optical member may be a diffraction grating or a prism, and as the diffraction grating may be applied one which is obtained by removing a portion of glass by ablation (a process similar to evaporation) through irradiating a laser beam, or a diffraction grating formed by a slotted member of metal or resin.

DESCRIPTION OF THE PREFERRED EMBODIMENTS

Figure 1:
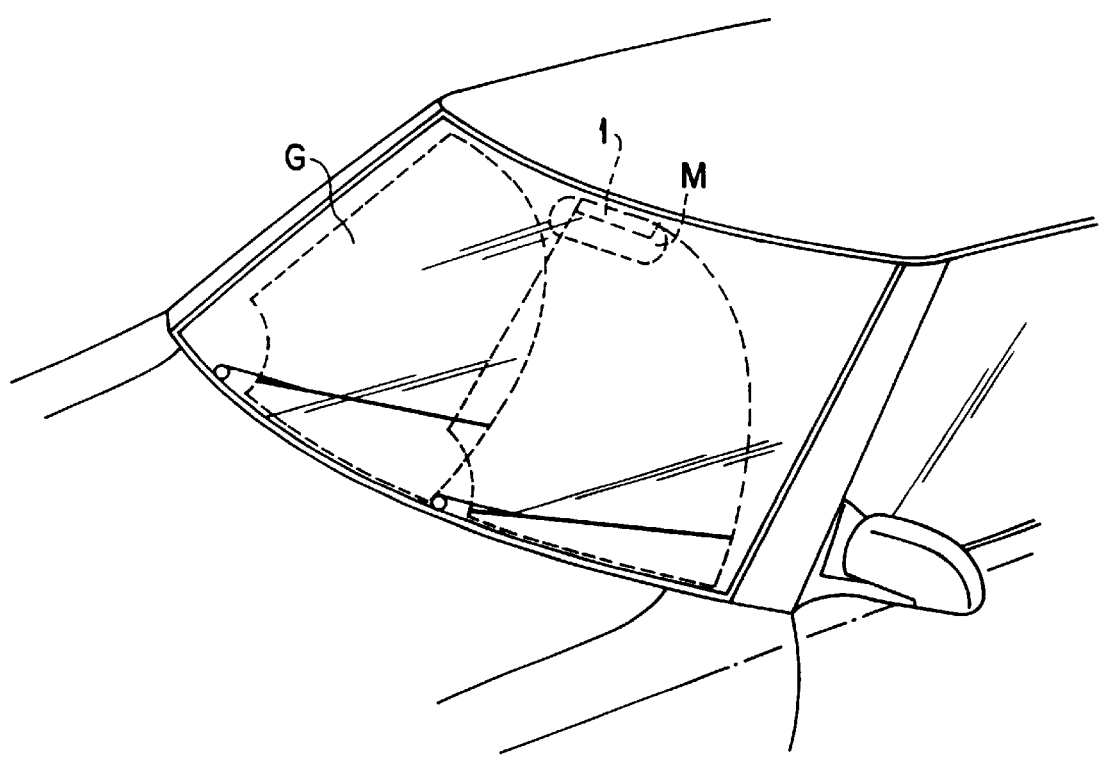
FIG. 1 is a perspective view of a front portion of a car equipped with the liquid drop detector according to the present invention.
Figure 2:
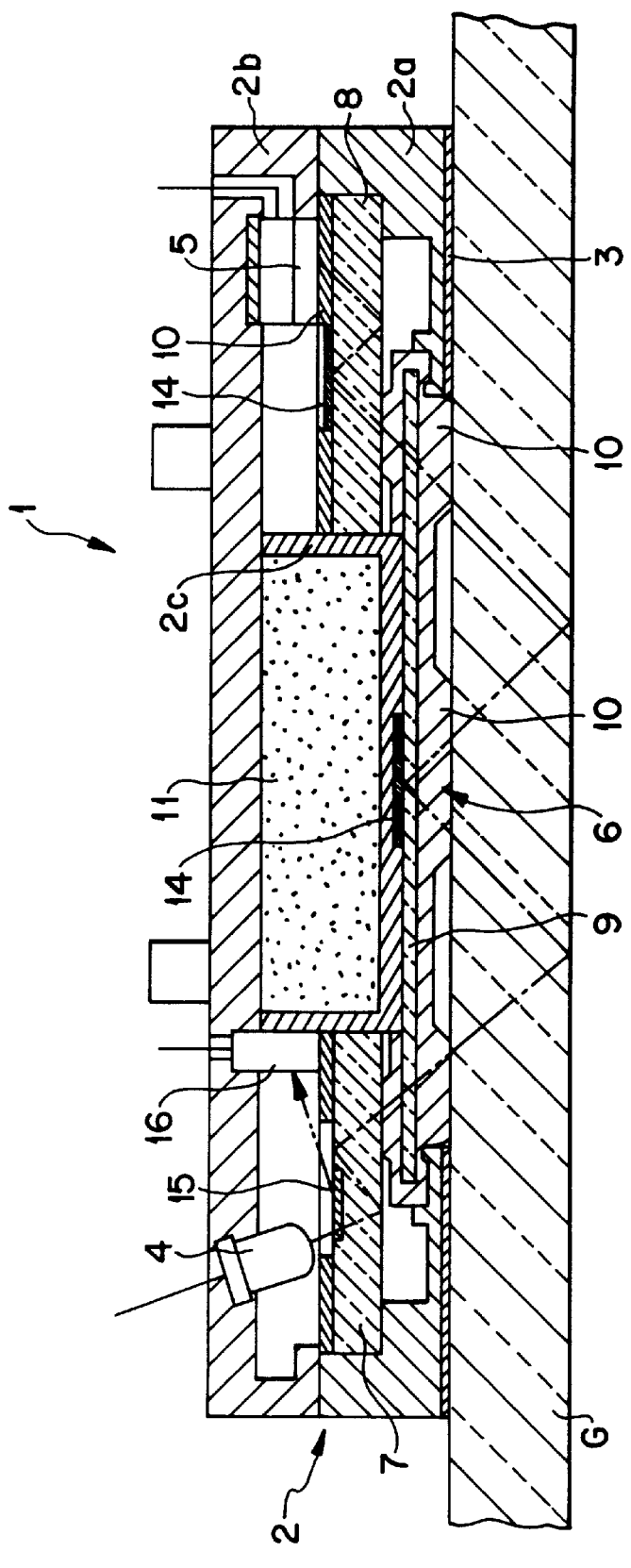
FIG. 2 is a cross-sectional view of the liquid drop detector according to the present invention, the liquid drop detector in the figure being attached to a glass plate.
Figure 3:
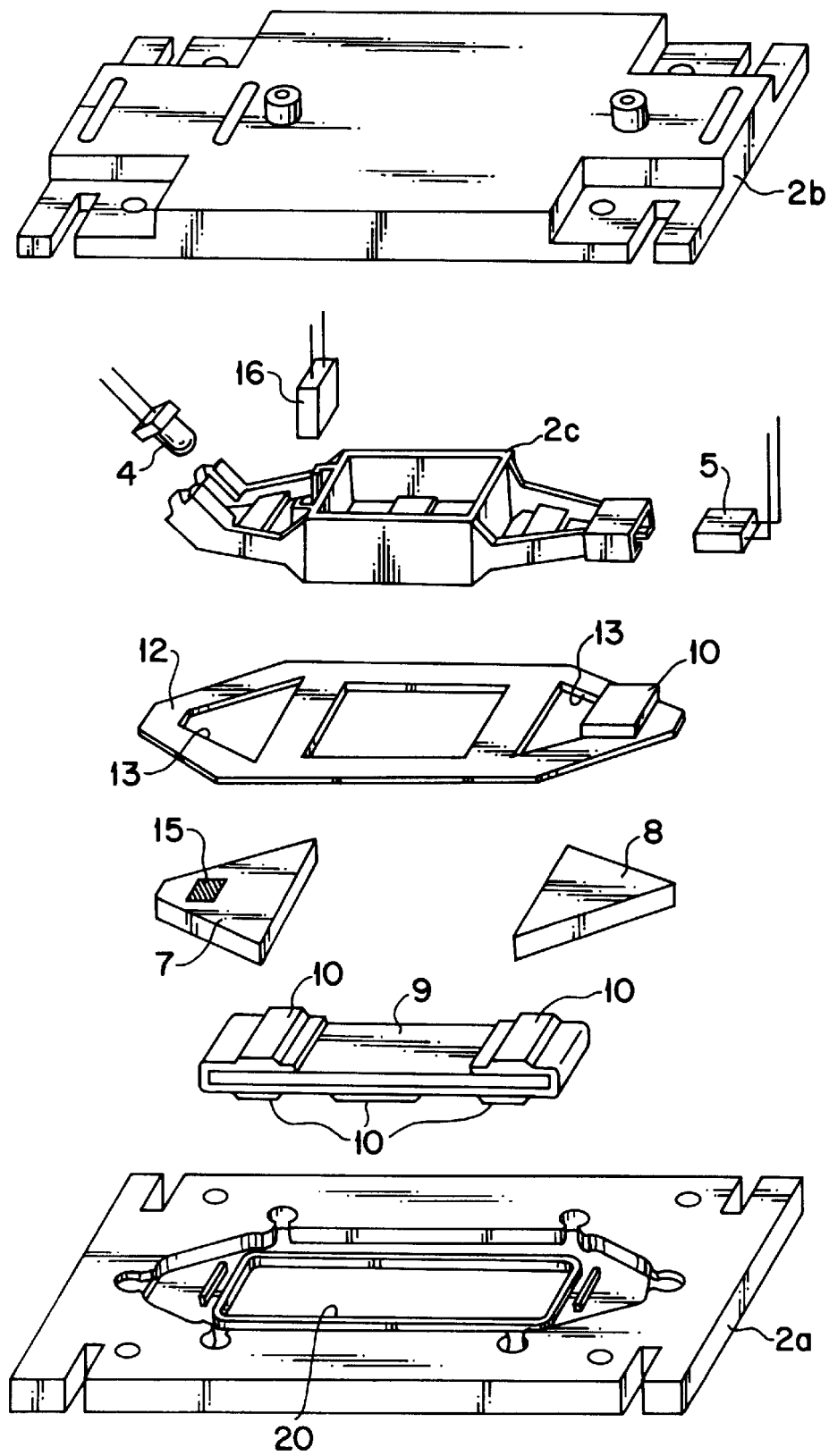
FIG. 3 is an exploded perspective view of the liquid drop detector according to the present invention.

Hereinafter, a detailed explanation of the embodiments of the present invention will be given with reference to the attached drawings. Here, FIG. 1 is a perspective view showing an example of a car equipped with a liquid drop detector according to the present invention; FIG. 2 shows a crosssectional view of the liquid drop detector according to the present invention, of the detector in the figure being attached to a glass plate; and FIG. 3 shows a exploded perspective view of the liquid drop detector according to the present invention.

On an interior portion of a windshield G of an automobile, in particular on a portion being hidden by a rear-view mirror M, is provided a liquid drop detector 1 according to the present invention. The position where the liquid drop detector 1 is to be attached should not limited only to the portion of the windshield mentioned in the above, as the detector may also be attached arbitrarily, such as at any peripheral portion on the interior side surface of the windshield G.

The liquid drop detector 1 is so constructed that a plurality of elements thereof are provided or stored in a case 2, and the case 2 is constructed with a base 2a of aluminum or resin being bonded onto the interior surface of the windshield G and a cover 2b which is attached to the base 2a by a screw(s).

The cover 2b can be attached to the base 2a at both ends in the longitudinal direction thereof, however it also can be attached to the base 2a by fixing only one end thereof with the screw while keeping the other end in the longitudinal direction free, fixed by only insertion, so as to allow for a change in the length thereof due to a change of temperature.

Further, a holder 2c is fixed between the base 2a and the cover 2b, wherein the holder 2c holds a light emitting element 4, such as a LD (Laser Diode) or a LED (Light Emitting Diode), at one end and a light receiving element 5, such as a PD (Photo Diode), at the other end, in the longitudinal direction thereof. Also, between the base 2a and the holder 2c, there is provided a light guiding means 6 for guiding the light emitted from the light emitting element 4 to the light receiving element 5.

The light guiding means 6 is constructed with a light guiding body 7, comprised of glass into which enters the light emitted from the light emitting element 4, a light guiding body 8 comprised of glass which guides and introduces the emitted light into the above light receiving element 5, a light-guiding body 9 comprised of glass which is disposed with each end thereof overlaying one of the light guiding bodies 7 and 8, and further silicon members 10 inserted between the light guiding bodies 7, 8 and light guiding body 9, and between the light guiding body 9 and the interior surface of the windshield G.

The silicon members 10 are elastic bodies having a refraction index being approximately equal to that of the light guiding bodies 7, 8 or 9 which are comprised of glass, and to that of the windshield G as well, and the thickness thereof is so set that, under a condition where the cover 2b is attached onto the base 2a, they are fitted tightly between the light guiding bodies 7, 8 and 9 and the windshield G, thereby allowing no air to exist or intrude between the light guiding bodies 7, 8 and 9 and the silicon members 10 nor between the windshield G and the silicon members 10.

Significantly, if such air layers are allowed to remain or exist in the portions mentioned above, the light does not penetrate through but rather is totally reflected, thereby preventing the light emitted from the light emitting element 4 from reaching the windshield G and preventing the light undergoing total internal reflection within the windshield G from correctly reaching the light receiving element 5.

For the same reason, the silicon member 10 is also inserted or lies between the light receiving element 5 and the light guiding body 9, so as to prevent any air layer from forming. between the light guiding body 9 and the light receiving element 5. Such installation is carried out while applying pressure to avoid any space or air layer therebetween.

In the example shown in Figures, a belt-like silicon material is wound around the light guiding body 9 so as to be set into an opening 20 of the base 2a, however it is possible to dispose a plurality of silicon elements, each individually.

Further, it is also possible to apply a non-volatile liquid in place of the silicon members 10, the liquid having a refraction index being approximately equal to that of the light guiding bodies 7, 8, 9 and to that of the windshield G.

Further, though the light guiding bodies 7 and 8 are formed separately in the example shown in the Figures, they can be formed as one light guiding body. However, in this case, there is a possibility that a portion of the light incident from the light emitting element 4 does not enter into the windshield G but rather enters directly into the light receiving element 5, and therefore the light guiding bodies 7 and 8 are preferably to be formed as divided and separate bodies.

As mentioned in the above, by forming the light guiding bodies 7 and 8 separately, a space 11 is formed in a center portion. It is preferable to enclose a desiccant therein, since condensation may occur in the space 11 if it is thus formed.

Further, the light guiding body 7, having a thickness of approximately 3 mm, is formed in such a shape that both side surfaces gradually expand or enlarge along with the direction of light propagation, while the light guiding body 8 having a thickness of approximately 3 mm is formed in such a shape that both side surfaces gradually narrow or decrease in the direction of light propagation, i.e., towards the light receiving element 5.

By forming the light guiding body 7 into such a shape as mentioned above, it is possible to keep appropriate an opening angle of the light beam incident upon the light guiding body 7 from the light emitting element 4. Also, by forming the light guiding body 8 into such a shape as mentioned above, the amount of light passing through (escaping) can be decreased compared to a case where the light guiding body 8 is formed in a square or rectangular shape (in a plan view thereof), and thereby the utilization ratio of the light emitted from the light emitting element 4 is increased.

Figure 4:
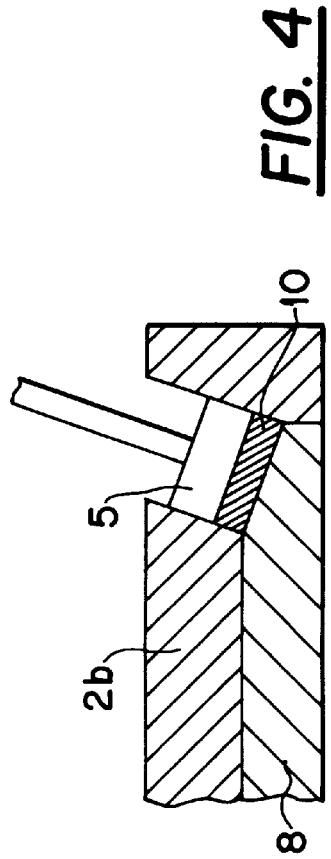
FIG. 4 shows another embodiment of a light guiding body according to the present invention.

Further, as shown in FIG. 4, with provision or forming of an oblique surface at the end surface of the light guiding body 8, the amount of light escaping at said end surface by total internal reflection can be lowered, thereby increasing the light incident upon the light receiving element 5 so as to improve the sensitivity. In the same manner, the surface of the light guiding body 7 opposite to the light emitting element 4 also can be formed or provided with such an oblique surface.

For manufacturing the light guiding bodies 7 and 8 in such shapes as mentioned above, while they may be produced by cutting and grinding a glass plate, they may also be formed by mold forming without using cutting and grinding processes.

Also, the light guiding bodies 7, 8 are located inside of a window 13 which is formed in the light shielding member 12, being of a sheet-like shape, and at appropriate positions on the surfaces of the light guiding bodies 7, 8, 9 are provided reflection films 14 comprising a metal thin film. However, in particular, the reflection films 14 must not be provided when the light beam is incident upon the light guiding bodies 7, 8, 9 at the angle experiencing the total internal reflection.

A diffraction grating 15 is further provided on an upper surface of the light guiding body 7. This diffraction grating 15 is provided for the purposes of guiding the light from the light emitting element 4 into the light guiding body 7 at a predetermined angle and of reflecting a portion of the light emitted from the light emitting element 4 upon the light receiving element 16 for monitoring.

In this manner, with provision of the light receiving element 16 for monitoring so as to adjust the light amount received on it to be constant, a stable amount of light can be guided into the light guiding body 7.

Though a prism can be applied in place of the diffraction grating mentioned above, the diffraction grating is preferable taking small size and low weight thereof into consideration.

The diffraction grating means is an optical element, provided on the glass surface on which are formed fine or minute grooves, or the like. It is common that such diffraction gratings are designed with a groove pitch within a range from 0.4 to 3 μm, and such configurations are applied to a variety of uses. They are primarily used for separating the spectral constituents of light, in particular in a case where monochromatic light is used, and they can be further used for dividing, separating or bending a light beam, by the diffraction effect inherent to light upon passing through a space having a certain size with relation to the wavelength of the light.

The diffraction grating, alternatively to the above-mentioned type, can be a reflection-type diffraction grating, a slit-type diffraction grating, or a diffraction grating in which the refraction index varies periodically.

With use of the diffraction grating, it is possible to introduce the light into the light guiding body 7 at an predetermined angle. Further, by selecting the incident angle upon the diffraction grating as an appropriate angle, it is possible to set up the invention such that the introduced light undergoes total internal reflection within the windshield G. Further, on the basis of the same principle, the diffraction grating may be provided on the light guiding body, so as to introduce the light undergoing total internal reflection within the windshield G onto the light receiving element 5 at an predetermined angle.

A further method of manufacturing the diffraction grating that may be considered is to use the ablation phenomenon by evaporation of the glass surface in a part thereof, by use of a laser beam.

The ablation phenomenon is a phenomenon which occurs due to absorption of the laser beam energy by the glass. In a case where silver is contained up to a predetermined depth from the top surface of the glass substrate, in the form of Ag atoms, Ag colloid or Ag ions, and where further the silver concentration has a sloped profile, being the highest at the top surface on which a laser machining is to be carried out and decreasing gradually toward the predetermined depth, the ablation phenomenon occurs from the top surface layer toward the inside sequentially, thereby obtaining minute machining without causing cracks nor fragmenting of the glass.

In the present embodiment the diffraction grating is formed directly onto the glass from which the light guiding body 7 is formed, however the diffraction grating can be formed on a separate glass in a sheet-like form to be affixed onto the light guiding body 7.

In the above, the light which is emitted from the light emitting element 4 and introduced into the light guiding body 7 through the diffraction grating 15, after undergoing total internal reflection therein, is introduced inside the windshield G through the silicon member 10 which is in direct contact with the light guiding body 7 and has the same refraction index thereof, the light guiding body 9, and the silicon member 10 lying between the light guiding body 9 and the windshield G.

Then, the light introduced into the windshield G, after repeated total internal reflections therein, is received by the light receiving element 5 through the silicon member 10 between the light guiding body 9 and the windshield G, the light guiding body 9, the silicon member 10 between the light guiding bodies 9 and 8, and the light guiding body 8.

In this instance, when rain drops adhere to the outside surface of the windshield G at points corresponding to the total internal reflection points, the light introduced into the windshield G passes through the surface of windshield G without undergoing total internal reflection therein. As a result of this, the light received by the light receiving element 5 is lessened in the amount thereof, thereby enabling detection of the adhesion of rain drops based thereupon so as to output a signal for driving a device or system such as the wiper.

The liquid drop detector according to the present invention should not be limited only to application in a rain sensor for use in an automobile, but is also applicable to the windshield of an electric train or a window glass of a structure, and the transparent substrate to which the liquid drop detector according to the present invention can be applied may be glass comprised of combined or piled-up layers.

As is apparent from the above explanation, the liquid drop detector according to the present invention may be attached to an existing glass window, etc., with ease, and the light emitted from the light emitting means can be transmitted to the light receiving means reliably and efficiently. Further, the liquid drop detector according to the present invention prevents light from entering the detector from outside and additionally prevents condensation from forming within the case, thereby further enabling the detection of the adhesion of liquid drops with accuracy and reliability.

In particular, with use of the optical element, such as the diffraction grating, etc., it is possible to adjust the angle of the light incident and also to divide and direct a portion of the incident light to the monitor with ease, thereby achieving a stable detection to be used effectively as the basis of a rain sensor for an automobile.

What is claimed is:

1. A liquid drop detector attached on a first side surface of a transparent substrate to detect plural liquid drops present upon a second, opposite side surface thereof, comprising:
   a case body attached on the first side surface of the transparent substrate;
   a light emitting device which emits a light;
   a light receiver which receives the light;
   a light guide constructed and arranged to guide the light into the transparent substrate, and to guide the light from the transparent substrate to the light receiver,
   the light receiver, the light guide and the light emitting device each being disposed within the case body,
   the light guide comprising:
     a first light guide member, disposed adjacent to the light emitting device,
     a second light guide member, disposed adjacent to the light receiver,
     an elongated light guide, having a first end disposed adjacent to the first light guide member and a second end disposed adjacent to the second light guide member,
     conformable material disposed between the first light guide member and the elongated light guide, between the second light guide member and the elongated light guide and between the elongated light guide and the transparent substrate, the conformable material substantially filling gaps therebetween, and having an index of refraction substantially equal to indices of refraction of the first light guide member, the second light guide member and the elongated light guide.

2. A liquid drop detector as defined in claim 1, wherein said conformable material has elasticity.

3. A liquid drop detector as defined in claim 1, wherein the first light guide member and second light guide member are formed separately.

4. A light drop detector as defined in claim 3, wherein the first and second light guide members have light shielding constructed and arranged to prevent entrance of light other than the light emitted by the light emitting device.

5. A liquid drop detector as defined in claim 4, wherein said first and second light guide members are provided inside a light shielding member for preventing intrusion of any exterior light.

6. A liquid drop detector as defined in claim 1, wherein said case includes a base to be fixed onto the first side surface of said transparent substrate and a cover to be attached onto said base, and an inside of said case is kept air-tight under a condition that said cover is attached onto said base.

7. A liquid drop detector as defined in claim 1, wherein a desiccant is provided within said case.

8. A liquid drop detector as defined in claim 1, further comprising a monitor which detects a portion of light emitted from said light emitting, device wherein an amount of light emitted is adjusted so that the light received by the monitor is kept constant.

9. A liquid drop detector as defined in claim 1, wherein said conformable material comprises a non-volatile liquid.

10. A liquid drop detector comprising:
    a case body attached on one side surface of a transparent substrate;
    a light emitter which emits a light;
    a light receiver which receives the light;
    a light guide which guides the light emitted from said light emitter into said transparent substrate wherein the light undergoes total internal reflection, the light guide further guides the light undergoing total internal reflection within said transparent substrate to said light receiver, wherein said light emitter, light receiver and said light guide are provided inside said case body;
    wherein said light guide is constructed with a plurality of light guiding bodies piled up in a direction of the thickness of said detector, and non-volatile liquid lies between any among said plurality of light guiding bodies or between said light guiding body and said transparent substrate.

11. A liquid drop detector attached on a first side surface of a transparent substrate to detect plural liquid drops present upon a second, opposite side surface thereof, comprising:
    a case body attached on the first side surface of the transparent substrate;
    a light emitting device which emits a light;
    a light receiver which receives the light;
    a light guide constructed and arranged to guide the light into the transparent substrate, and to guide the light from the transparent substrate to the light receiver,
    the light receiver, the light guide and the light emitting device each being disposed within the case body,
    wherein said light guide comprises a light guiding body constructed and arranged to guide light from the light emitting device into the transparent substrate, the light guiding body widening, as the light proceeds downstream, the widening occurring in a dimension perpendicular to the propagation of the light and parallel to the transparent substrate.

12. A liquid drop detector attached on a first side surface of a transparent substrate to detect plural liquid drops present upon a second, opposite side surface thereof, comprising:

a case body attached on the first side surface of the transparent substrate;

a light emitting device which emits a light;

a light receiver which receives the light;

a light guide constructed and arranged to guide the light into the transparent substrate, and to guide the light from the transparent substrate to the light receiver, the light receiver, the light guide and the light emitting device each being disposed within the case body, wherein said light guide comprises a light guiding body constructed and arranged to guide light from the transparent substrate into the light receiver, the light guiding body narrowing, as the light proceeds downstream, the narrowing occurring in a direction perpendicular to the propagation of the light and parallel to the transparent substrate.

13. A liquid drop detector as defined in any one of claims 1 to 12, wherein said light guide further comprises an optical member for guiding the light emitted from said light emitting means into said light guiding means at a predetermined angle.

14. A liquid drop detector as defined in claim 13, wherein said optical member is a diffraction grating or a prism.

15. A liquid drop detector as defined in any one of claims 1 to 12, wherein said light guide further comprises an optical member for emitting the light toward said light receiving means from said light guiding means at a predetermined angle.

16. A liquid drop detector as defined in claim 15, wherein said optical member is a diffraction grating or a prism.

* * * * *